United States Patent [19]

Stenemann

[11] Patent Number: 4,731,973
[45] Date of Patent: Mar. 22, 1988

[54] PROFILED MEMBER FOR CLAMPING PLATE-LIKE ELEMENTS, ESPECIALLY PLATES OF GLASS FOR DISPLAY CASES, SHOP COUNTERS, EXPOSITION FURNITURE, OR THE LIKE

[75] Inventor: Bruno Stenemann, Beckum, Fed. Rep. of Germany

[73] Assignee: Gebrüder Vieler GmbH, Iserlohn, Fed. Rep. of Germany

[21] Appl. No.: 890,770

[22] PCT Filed: Oct. 12, 1985

[86] PCT No.: PCT/EP85/00535
§ 371 Date: Jun. 19, 1986
§ 102(e) Date: Jun. 19, 1986

[87] PCT Pub. No.: WO86/02245
PCT Pub. Date: Apr. 24, 1986

[30] Foreign Application Priority Data

Oct. 19, 1984 [DE] Fed. Rep. of Germany ....... 3438365

[51] Int. Cl.⁴ ............................ A47F 3/12; E06B 3/60
[52] U.S. Cl. ...................................... 52/767; 52/220;
52/282; 52/400; 312/140
[58] Field of Search ................ 52/282, 764, 766, 767,
52/669, 720; 312/140

[56] References Cited

U.S. PATENT DOCUMENTS

| | | | |
|---|---|---|---|
| 827,217 | 7/1906 | Daugherty | 52/769 |
| 967,383 | 8/1910 | Hunter | 312/140 |
| 2,063,120 | 12/1936 | Plym | 52/401 |
| 2,124,354 | 7/1938 | Plym | 52/282 |
| 3,477,182 | 11/1969 | Fulton | 52/28 |
| 3,494,686 | 2/1970 | Diack | 312/140 |

Primary Examiner—John E. Murtagh
Attorney, Agent, or Firm—Becker & Becker, Inc.

[57] ABSTRACT

A profiled member for clamping plate-like elements, including a slot that accommodates the edge of a plate-like element. A clamping strip having a wedge-shaped cross-section is disposed in this slot, and the clamping strip is pressed against the plate-like element via pressure screws. The clamping strip is disposed in an enlarged slot portion that is provided with a guide surface for guiding the wedge-shaped clamping strip. So that the clamping action is particularly reliable, secure, and easy to operate, it is proposed that the direction of abutment or impact of the pressure agent that acts upon the clamping strip extend essentially parallel to the guide surface, and that the wedge point of the wedge-shaped clamping strip face the base of the slot. In the enlarged slot portion, the guide surface is disposed at a greater and greater distance from the plate-like element as one proceeds in the direction toward the opening of the slot.

18 Claims, 14 Drawing Figures

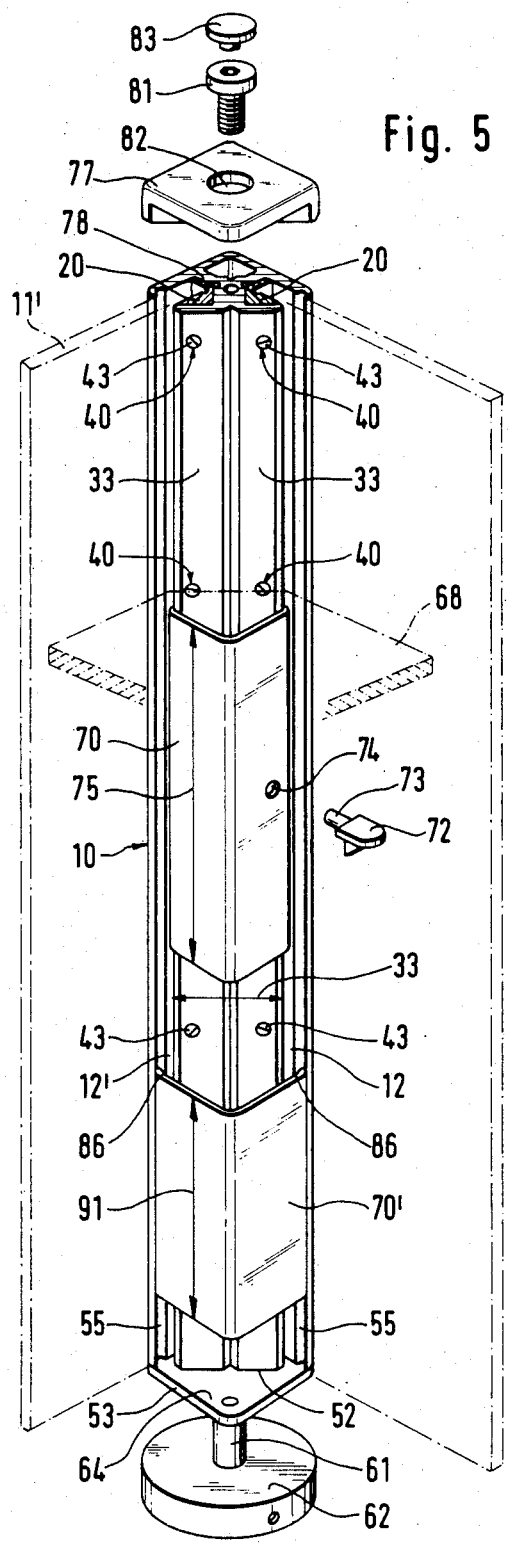
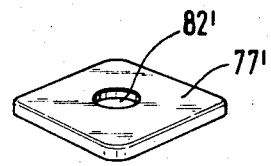
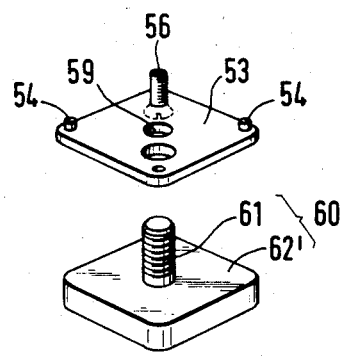

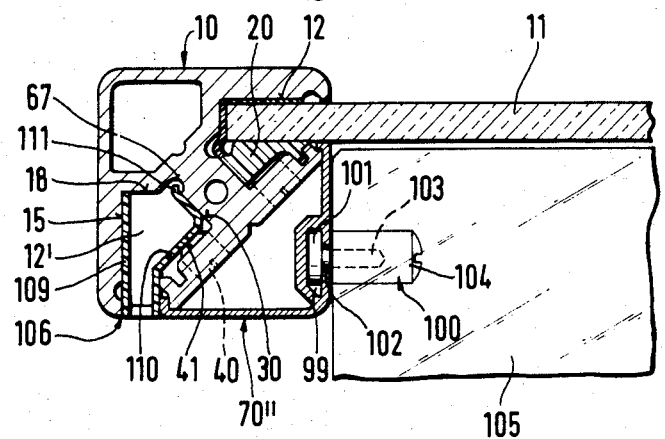
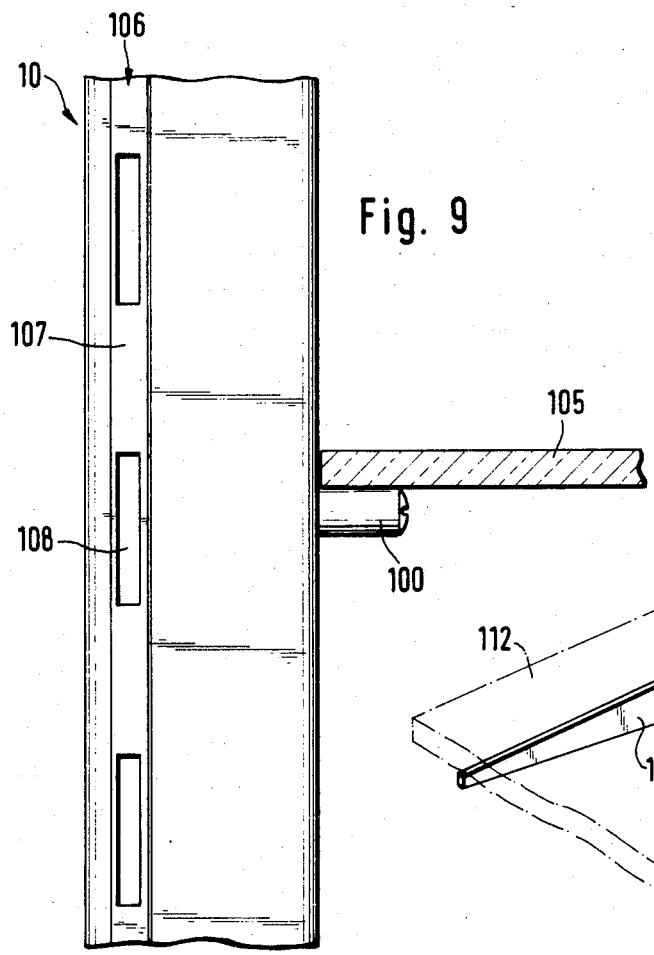
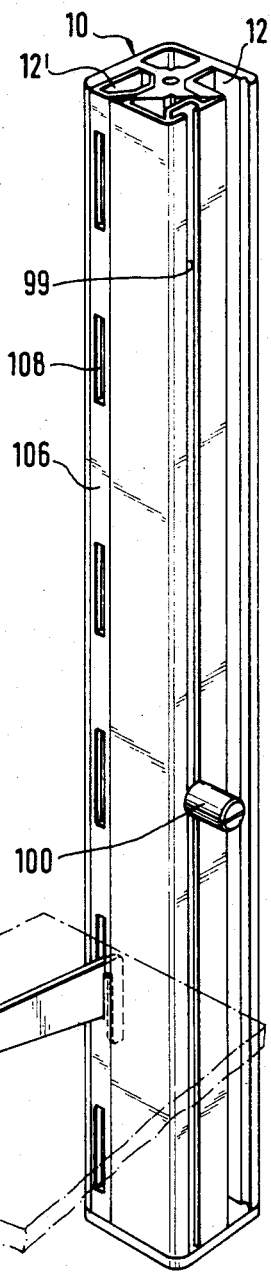

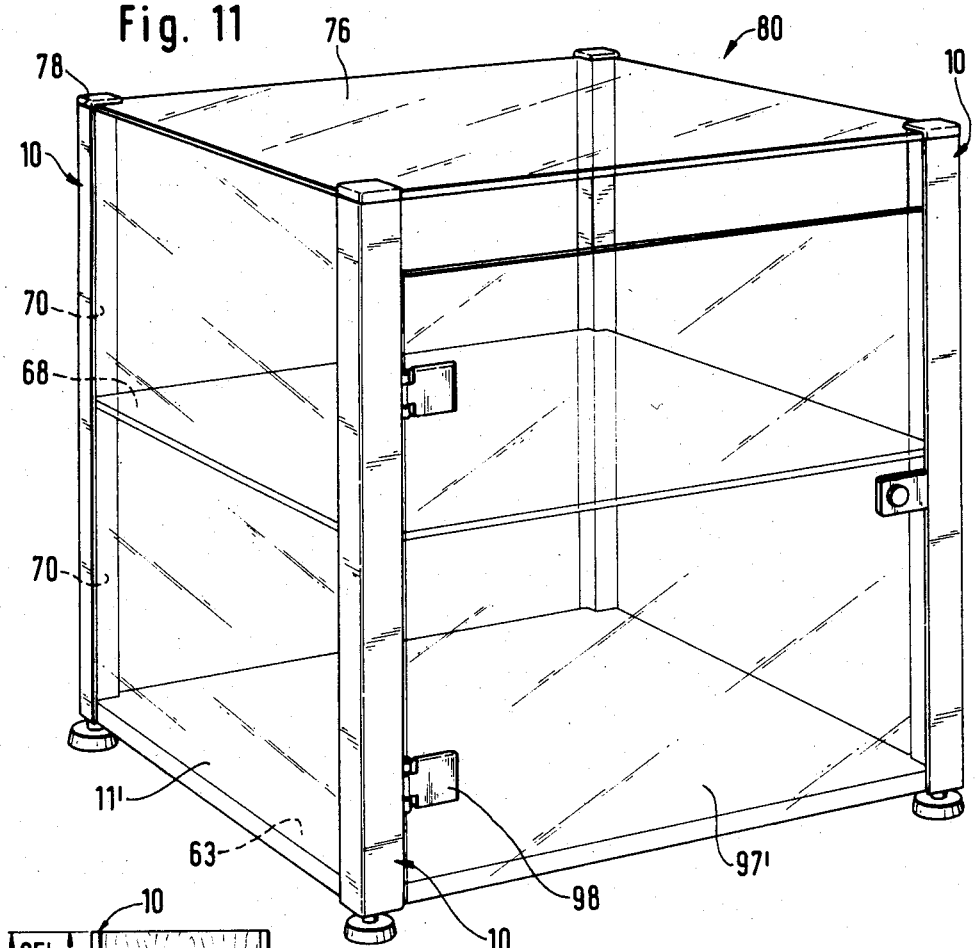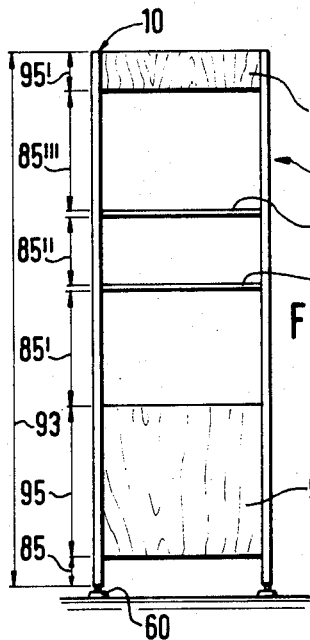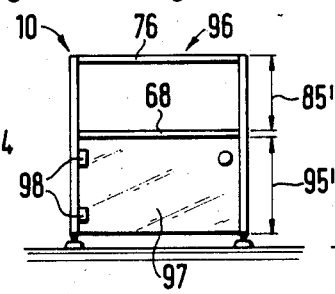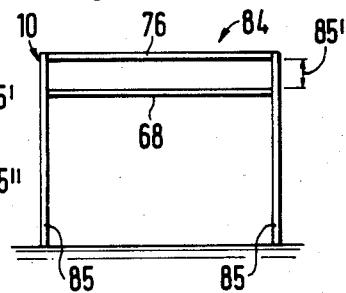

PROFILED MEMBER FOR CLAMPING PLATE-LIKE ELEMENTS, ESPECIALLY PLATES OF GLASS FOR DISPLAY CASES, SHOP COUNTERS, EXPOSITION FURNITURE, OR THE LIKE

BACKGROUND OF THE INVENTION

The present invention relates to a profiled member for clamping plate-like elements, especially plates of glass, for display cases, shop counters, exposition furniture, or the like.

DESCRIPTION OF THE PRIOR ART

In contrast to other plate fastening means having clamping strips (German Pat. No. 875,435 Braun dated May 4, 1953), profiled members have the advantage of a more completely effective and easier securing of the plate-like elements. Such profiled members are known as gripping strips for the front plates of shop counters, and are provided with a groove or slot for accommodating the edge of a plate-like element. They have an enlarged slot portion that widens in the direction toward the base of the slot, and serve for mounting a clamping strip having a wedge-shaped cross-section, the wedge point of which faces the introduction opening of the slot. Disposed in the enlarged slot portion, in the region of the base of the slot, is a threaded bore in which is adjustably provided a pressure screw which contacts an abutment surface of the clamping strip that delimits the wedge cross-section. The pressure application direction of the pressure screw that acts upon the clamping strip here extends parallel to the plane of the plate-like element, so that the force exerted by the pressure screw is deflected, with only a small force component being used for clamping the introduced plate-like element. Since during the clamping process the clamping strip moves in the direction toward the opening of the slot, there exists the danger that the plate-like element will be taken along, and will therefore be increasingly pressed out of the slot. There is no assurance that the plate-like element will always be held securely in the slot of the profiled member to the completely desired depth.

An object of the present invention is to provide an economical profiled member of the aforementioned general type whereby the plate-like element can be reliably and particularly securely clamped in the slot via a simple and convenient operation.

SUMMARY OF THE INVENTION

This object is realized by the profiled member of the present invention, which comprises: at least one slot means that extends in the longitudinal direction of the profiled member, with each slot means being defined by a first and a second stationary planar wall, with these walls being disposed at an angle to one another, and with one of these walls being in the form of a guide surface, with said slot means being further defined by a third wall that proceeds from the second wall and, remote from the latter, has a free edge that defines an introduction opening, for a plate-like element, remote from a base portion of the slot means that interconnects the first and second walls, with the third wall and the second wall defining a triangular-shaped, enlarged portion of the slot means, with the third wall being provided with threaded through-holes for accommodating pressure-applying screws; also provided is a profiled clamping strip that can be accommodated in the enlarged slot portion and can be displaced by the pressure-applying screws, with each clamping strip having a fundamentally wedge-like cross-sectional shape which, when the clamping strip is installed in an enlarged slot portion, includes a wedge point region that faces the base portion of the slot, a first wedge surface adjacent to the wedge point that is displaceably supported on the guide surface, a second wedge surface adjacent to the wedge point that extends parallel to the first wall and defines, within the slot means, a parallel-walled slot of changeable width for accommodating and holding in place an edge portion of a plate-like element, with said clamping strips also including an abutment surface that interconnects the first and second wedge surfaces and is acted upon by the pressure-applying screws, with the pressure-application direction of each screw extending parallel to the guide surface; said clamping strip is furthermore provided with integral parts that project from the wedge-like cross-sectional shape and are disposed in the slot means to secure the position of the clamping strip in the enlarged slot portion, with at least a portion of one of the integral parts extending parallel to the guide surface and being accommodated, for effective guidance, in a complementary aperture provided in the third wall and also extending parallel to the guide surface.

Because the pressure application direction of the screw extends parallel to the guide surface of the clamping strip, a particularly high clamping force is exerted upon the plate-like element. This results already when the screw is tightened only slightly, so that there is no danger to fear a deformation of the structural components. The force exerted by the pressure screw is utilized fully for clamping the plate-like element. With this orientation of the pressure application direction, there also results a particularly convenient operation of the pressure screw, because the tool for tightening or loosening the screw then extends at an angle to the plane of the plate-like element, so that the latter does not obstruct the hand that operates the tool. Since the region of the wedge point faces the base of the slot, and the guide surface of the enlarged slot portion that serves for guiding the wedge-shaped clamping strip extends at an angle to the plane of the plate-like element, the clamping strip tries to move as deep into the slot as possible when the screw is tightened, in this way taking the plate-like element along. The more the pressure screw is tightened, the more the plate-like element is pressed against the base of the slot. This assures a reliable clamping of the plate-like element via a high clamping force.

The various functions of the clamping strip can be optimized. Where the pressure is exerted, hard material is used, whereas in the remaining regions, where, for example, only sealing functions are provided, softer and hence also more easily deformable material is used. These features have independent, patentable significance. This can also be used for clamping strips of synthetic material, such as PVC, that can be produced in a particularly economical manner by producing the two zones of the clamping strip by co-extrusion, including a coordinated, side-by-side extrusion of the two zones, with a subsequent combining of the zones in a common tool that has the overall cross-section of the clamping strip.

Securing the clamping strip in the slot has the advantage that the clamping strips, despite the enlarged portion of the slot, cannot fall out or move into a wrong position if no plate-like element is in the slot. Thus, it is possible already during the manufacture of the profiled member to provide the latter with the clamping strip. There is also no danger that the clamping strip will tilt or twist when the slot is empty; the introduced plate-like element will always be clamped by a properly positioned clamping strip. For this purpose there are various measures, which can also be used simultaneously.

A first possibility for securing the position is provided by a flexible flap that projects from the wedge-shaped fundamental cross-section of the clamping strip, with at least a portion of the flap extending transverse to the slot in the installed state of the clamping strip. The features previously described for constructing the clamping strip can be used for a differing material construction where the flap forms the edge zone that comprises soft material, and the wedge-shaped fundamental cross-section forms. If the flap extends in front of the base of the slot, such a flap can also serve as a soft abutment for the introduced plate-like element. Due to a good securing of the position of the clamping strip, a relatively long flap is used which, due to the deformation of the material during clamping, can also be extended; however, due to the recess of provided especially in the region of the base of the slot, disruptive excessive lengths are eliminated. This can be effected by folding the flap. In order to enhance this effect, it is recommended to provide an undercut at the contact area of the flap. It is particularly advantageous to give the flap an angular shape, and to integrate its base part into the wedge-shaped contour region.

A further possibility for securing the position of the clamping strip is provided by a profiled projection which, however, in contrast to the flexible flap, is rigid. In this way, the profiled projection can also carry out guidance functions during movement of the clamping strip if the profiled projection essentially extends in the pressure-application direction of the pressure-applying screws and is provided with planar side surfaces that rest against planar sides of the aperture that accommodates them.

Giving particularly good results is a configuration of the clamping strip in the shape of a right isosceles triangle where the hypotenuse forms the clamping or wedge surface that presses against the plate-like element, the first short side of the triangle that faces the base of the slot forms the slide surface that is guided along the guide surface of the profiled member, and the second short side of the triangle that faces the opening of the slot forms the abutment surface for the pressure-applying screw. The contact area of the flap can be integrated into the triangular region, and the profiled projection can project from the second short side of the triangle and extend parallel to the first short side. The configuration of the profiled projection where the profiled projection, when viewed in the cross-section of the clamping strip, on the one hand comprises a profiled end portion that has parallel side surfaces, and on the other hand comprises a profiled base portion that is wider than the end portion and is seated on the second short side of the triangle is particularly advantageous because this configuration increases the stability of the profiled projection.

The inventive profiled member can additionally be provided with a cover strip that, by extending partly or completely into the slot, can be secured to the profiled member, for example via a snap connection. These cover strips cover the operating locations of the pressure screws in the profiled members, and can advantageously at the same time serve for the support of shelves in a piece of furniture.

In place of a plate-like element, it is also possible to connect strips having a U-shaped cross-section with the profiled member if the legs of such strips are formed in conformity with the contour of the clamping strip. The pressure screws can also be used to secure such a U-profile strip.

BRIEF DESCRIPTION OF THE DRAWINGS

The drawings illustrate the present invention via several exemplary embodiments. Shown are:

FIG. 5 is a view providing a perspective illustration of one application of the inventive profiled member as a corner support in a piece of furniture, and shows the components illustrated in FIGS. 3 and 4, FIG. 6 is a view that shows an alternate form for an upper component of the corner support of FIG. 5, FIG. 7 is an exploded view of an alternate form for a lower component of the corner support of FIG. 5, FIG. 8 is a cross-sectional view similar to that of FIG. 1 through a profiled member in which a strip having a U-shaped cross-section has been introduced, FIG. 9 is a front view of the profiled member shown in FIG. 8, with the strip having the U-shaped cross-section being embodied as a slotted strip, FIG. 10 is a perspective view of the profiled member as it is used pursuant to FIGS. 8 and 9, and more clearly showing the application possibilities for the slotted strip, and FIGS. 11 to 14 are perspective illustrations or views of pieces of furniture that can be constructed with the inventive profiled members using plate-like elements.

DESCRIPTION OF PREFERRED EMBODIMENTS

Figure 1:
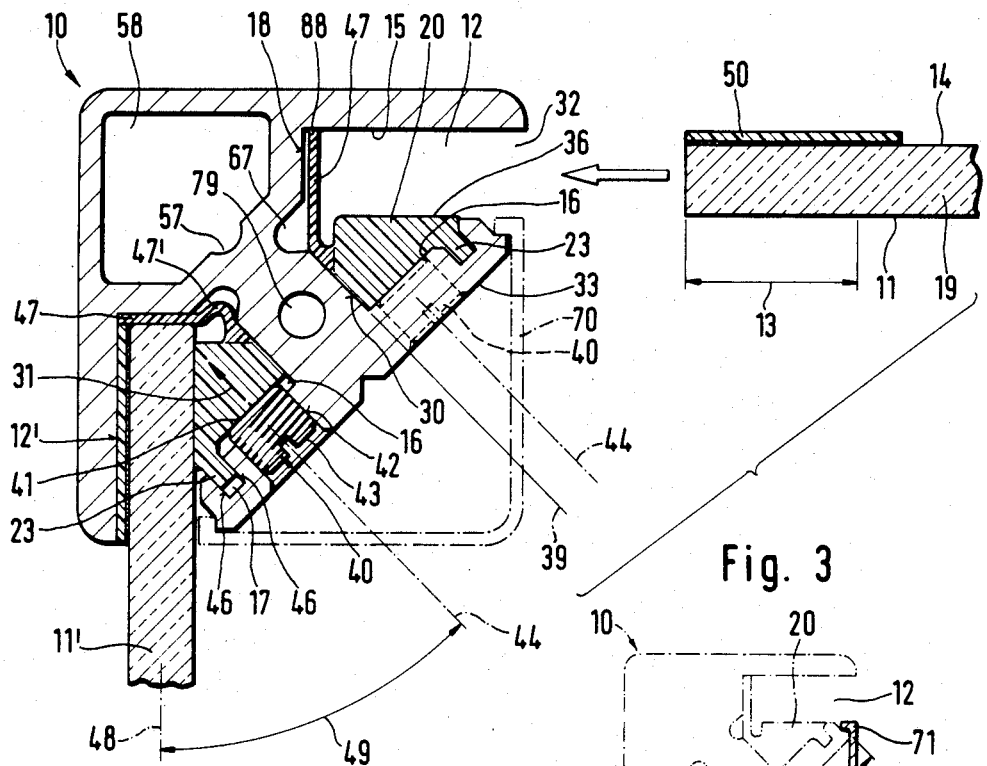
FIG. 1, an enlarged, cross-sectional view through one inventive profiled member with one plate-like element clamped therein, and with another plate-like element removed from the profiled member, FIG. 2, a greatly enlarged cross-sectional view of a compression or clamping strip used with the inventive profiled member, FIGS. 3 and 4, in nearly actual size, are cross-sectional views of two different cover strips, either of which could be used with the inventive profiled member of FIG. 1.

In FIG. 1, the bar or profiled member 10 is designed for connecting the corners of two plate-like elements 11, 11'. For this purpose, the profiled member is provided with two longitudinally extending grooves or slots 12, 12', both of which are identical, so that it will be sufficient to describe one slot 12 and its components.

Figure 2:
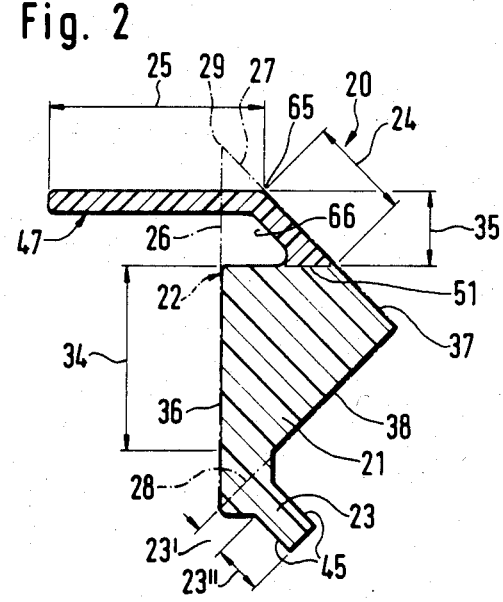

The slot 12 serves to receive an edge portion 13 of the plate-like element 11 to the desired depth, whereby a stationary slot wall 15 that is formed by the profiled member itself rests against the side 14 of the plate-like element. On the opposite side, an enlarged slot portion 16 is located in the profiled member. A compression or clamping strip 20 having the profile 21 shown in FIG. 2 is mounted in the enlarged slot portion. The profile of the clamping strip has the following appearance:

The clamping strip 20 primarily has the fundamentally wedge-shaped profile 22 that is defined by dot-dash lines in FIG. 2, namely the profile of an isosceles right triangle. Projecting from one side of this triangle 22 is the end piece 25 of a profiled flap 47, and projecting from the other side is a profiled projection 23. The clamping strip 20 basically comprises two zones 34, 35 which are made of materials that differ from one another, as indicated by the different cross-hatchings in FIG. 2. The material is plastic, namely PVC or polyvinylchloride, which has different hardnesses. The core zone 34, which determines the actual wedge-profile 22, comprises a relatively hard material, namely PVC having a Shore hardness of 100. The other zone forms an edge zone 35 which is made of softer material, namely PVC having a Shore hardness of 70. Where the two zones 34, 35 contact one another, namely at the contact area 51, they are securely interconnected by being glued or fused together. In this way there results a clamping strip 20 that, although being combined from two different zones 34, 35, is nonetheless one piece. The clamping strip is produced by so-called co-extrusion. The two zones 34, 35 are initially extruded separately of one another, but are immediately joined and pressed together by a common tool, resulting in a secure and permanent connection at the contact area 51.

The flap 47 itself is angled. Beginning at the aforementioned contact area 51 is a base part 24 of the flap, with this base part chiefly extending in the direction of the first short side 27 of the triangle. Connected to this base part, via a bend 65, is the free end piece 25 of the flap 47, with this end piece extending at right angles to the hypotenuse 26 of the triangle. At the connection location 51 of the base part 24, there thus results an undercut 66 between the flap 47 and the core zone 34 that is made of hard material. Critical for the yet to be explained wedge action are the hypotenuse 26 and the aforementioned first short side 27 of the triangle; this hypotenuse and short side determine, as shown in FIG. 2, the region of the wedge point 29, which here is not physically present. This flap 47, as well as the aforementioned profiled projection 23, serve to secure the position of the clamping strip 20 in the groove 12, as can be seen from the following:

In the assembled state of FIG. 1, the flap 47, in the region of the base 18 of the slot, extends transverse to the orientation of the latter, with the end 88 of the flap being supported against the stationary slot wall. As a result, the clamping strip 20 is held in the aforementioned enlarged portion 16 of the slot, even if the plate-like element 11 is not disposed in the slot 12. At the same time, the profiled projection 23 extends into an aperture 17 of the enlarged portion 16 of the slot.

As can be seen from FIGS. 1 and 2, the profiled projection 23 initially extends beyond the other short side 28 of the triangle with a trapezoidal profiled base portion 23' that merges into a profiled end portion 23'' having parallel, planar side surfaces 45. In the assembled state of FIG. 1, these side surfaces 45 rest against planar sides 46 of the aforementioned aperture 17. Thus, in addition to holding the clamping strip 20, there additionally results a guidance effect during subsequently-to-be-described movements of the clamping strip 20. A further securing of the position occurs due to the fact that that wedge surface 37 of the clamping strip 20 that is determined by the first short side 27 of the triangle rests against a planar guide surface 30 that extends at an angle to the slot 12. The direction of extension of this guide surface is indicated more clearly in FIG. 1 via the dot-dash auxiliary line 39.

The other short side 28 of the wedge triangle 22 is disposed opposite the wedge point 29 and forms an "abutment surface 38" for the shaft end 41 of a screw 40, which, as can be seen in FIG. 1, can be screwed into a threaded hole 42 in that wall of the profiled member 10 that delimits the enlarged slot portion 16. The control ends 43 of the screws 40 project into the space between the two mounted plate-like elements 11, 11'; in this region, the control ends of the screws are easily accessible by a tool, for example a screwdriver, that can be operated manually. This is true because the line of application 44 of the screw 40 always forms an a 45° angle 49 with the plane 48 (indicated by a dot-dash line) of the two plate-like elements 11, 11'. The line of application 44, which is indicated by a dot-dash line in FIG. 1, is determined by the axis of the screw 40, and should be referred to as the "pressure-application direction 44" of the screw 40. When the screw is screwed in, the shaft end 41 presses against the abutment surface 38, thus moving the clamping strip 20 in the direction of the arrow 31 of FIG. 1. As a result, the one wedge surface 37 of the clamping strip 20 is pushed along the aforementioned guide surface 30 in the enlarged portion 16 of the slot, for which reason this wedge surface can be referred to as "slide surface 37". As can be seen from FIG. 1, the direction 39 in which the guide surface 30 extends, and hence in which the slide surface 37 extends, is disposed parallel to the pressure-application direction 44 of the screw 40. When the pressure screw 40 is tightened, the wedge point 29 of the clamping strip 20 moves deeper against the slot base 18. In so doing, the other wedge surface 36, which is disposed along the hypotenuse 26 of this triangle, acts as a "clamping surface" against the introduced plate-like element 11', and produces the movable slot wall 36 that can be recognized in the slot 12 and comes to rest against the facing side 19 of the plate-like element.

As can be seen in FIG. 1, in the edge portion 13, the plate-like element 11 that is to be introduced is provided on that side 14 thereof that is disposed opposite the aforementioned clamping surface 36 with a soft or yielding strip 50. This strip, for example, can be a plastic strip that can be glued to the plate-like element 11. The latter is then inserted into the slot 12 until the end edge of the plate-like element 11 abuts the transversely extending flap 47 in the slot base 18. This results in a yielding abutment surface for the end of the plate-like element. When the screw 40 is tightened, the clamping strip 20 moves in the direction 31 and takes along the introduced plate-like element, increasingly pressing the latter against the flap 47. When the clamping strip 20 is displaced in the direction 31, the length of the flap 47 is increased, forming a fold 47' that is pressed into a recess 67 disposed in the base 18 of the slot.

Various pieces of furniture, as exemplified in FIGS. 11 to 14, can be produced with the profiled member 10, because the following is common to all of them:

The profiled members 10 form vertical supports in the corner regions between which not only vertical but also horizontal plate-like elements can be disposed. Transversely extending metallic cross-pieces are not required. If glass plates are used, as is the case in FIG. 11, with the exception of the corner supports 10, nothing obstructs the view. FIGS. 5 to 7 show the construction of such a glass display case of FIG. 11. Naturally, modified forms of the illustrated profile members 10 could also be used where, instead of the 90°-position shown in FIG. 1, the two plate-like elements 11, 11' could extend at either an obtuse or acute angle relative to one another. Furthermore, it is also possible to provide more than two or less than two slots 12, 12' in the profiled member 10 for accommodating plate-like elements. However, in each case each plate-like element 11 has its own slot 12, its own clamping strip 20, and its own screws 40. Naturally, in place of the pressure screws 40, other pressure-application means could also be used for the movement 31 of the associated clamping strip 20; for example, a wedge could be used that is introduced behind the abutment surface 38.

The bottom end 52 of a support that is cut off from the profiled member 10 is provided with a bottom cap 53, which is shown in FIG. 7. The bottom cap is provided with corner pins 54 which in the assembled state engage the ends of channels 55 as shown in the alternative profiled members 10 of FIGS. 4 and 5. As shown in FIG. 7, the bottom cap 53 has a plurality of holes. Guided through the outer hole is a connecting screw 56 that extends into a circular recess 57 of a hollow space 58 of the profiled member 10. (see FIG. 1) The threaded shaft 61 of a base 60, the height of which can be adjusted, extends through a central hole 59; as shown in FIGS. 5 and 7, the base can have different base plates 62, 62'. To adjust the height of the base 60, the threaded shaft 61 can be screwed into a threaded central bore 79 of the profiled member 10.

Figure 3:
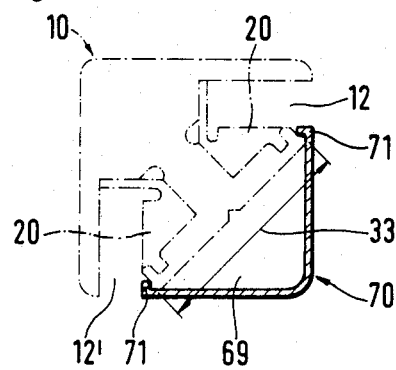

In the embodiment of FIG. 11, a bottom plate 63 is placed directly upon the free corner region 64 of the bottom cap 53 shown in FIG. 5. So that the bottom plate 63 cannot lift off, a cover strip 70 is supported thereon; the profile of this cover strip is shown in FIG. 3, and is indicated by dot-dash lines in FIG. 1. The cover strip 70 covers the inner side 33 of the profiled member 10, so that the control ends 43 of the pressure screws 40 are no longer visible. The cover strip 70 has an angular profile, and completes the square or rectangular cross-sectional shape of the profiled member 10. A hollow space 69 results wherein electrical lines or the like can be placed. The cover strip 70 can be mounted via a snap connection, for which purpose edge portions 71 are provided that extend into corresponding recess portions of the slot, so that in the adjacent region, the slot opening 32 remains free for the introduction of a plate-like element 11, as shown in FIG. 1. The cover strip 70 can be made of flexible material, such as aluminum or plastic. The cover strip 70 has a selected length 75, and has the further function of serving, with its upper end, as a support for a further bottom plate 68, as shown in FIG. 11. In conformity with FIG. 5, the plate 68 has cut-off corner regions which, although they cover the aforementioned hollow space 69, end prior to the inner side 33 of the continuous profiled member 10.

The glass display case 80 of FIG. 11 is finally provided with a top plate 76 that is supported in the same manner as the aforementioned bottom plate 68 via a further partial piece of a cover strip 70. To hold this top plate in place, the top cap 77 or 77' shown in FIGS. 5 and 6 can be used, with the one cap 77 being provided with a downwardly directed edge, whereas the other cap 77' is flat. If the cap 77 is used, the top plate 76 can rest upon the upper end 78 of the profiled member 10, whereas if the flat cap 77' is used, the top plate 76 has a cut-away corner portion as was the case with the aforementioned bottom plate 68. Securing of the top caps 77, 77' is effected via screws 81 that extend through holes 82 or 82' and can be screwed tightly into the already aforementioned central bore 79 of the profiled member 10. The head of the screw 81 can be masked or disguised with a cover 83.

As clearly shown in FIG. 5, it is also possible to mount plate supports 72 on the cover strips 70; the ends 73 of the plate supports extend into holes 74 of the cover strips 70. In this way, non-illustrated intermediate plates can also be arranged in the display case 80 of FIG. 11. In contrast, the length 75 of the individual cover strip members 70 determines the distance between the preliminarily standardized bottom and top plates 63, 68 and 76.

Figure 4:
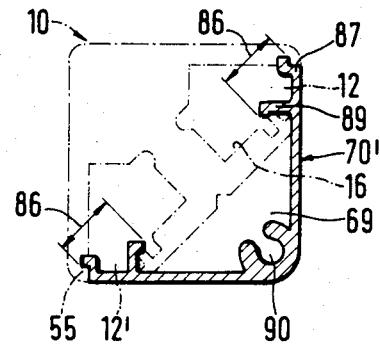

To the extent that support legs 85 are to be provided, as with the table 84 of FIG. 14, alternative cover strips 70' are used, the function and construction of which can be seen from FIGS. 4 and 5. In contrast to the previously described cover strips 70, these alternative cover strips are provided with wider edge portions 86, which close off the slot openings 32 in the manner of a stopper. Here also the profiled member 10 can be mounted via a snap connection, for which purpose projections 87, 89 are provided on the edge portions 86; these projections cooperate with the aforementioned channel 55 and aperture 17 in the profiled member 10. Since with the cover strip 70' no plates have to be secured, the clamping strips 20 can be omitted, as shown in FIG. 4. In the angle region of the cover strip 70', a recessed portion 90 can be provided for receiving a fastening screw if, for example, in the table 84 of FIG. 14, a plate 68 is to be placed upon the lower part of the support leg 85.

Starting from a profiled member 10 that is continuous over the entire length 93 of a piece of furniture, by suitable dimensioning and selection of the two cover strips 70 and 70' it, is possible to obtain sections which have the function of a support leg or of a connection support for plates, as can be seen in conjunction with the cabinet or case 92 of FIG. 12. After the bases 60, there follows first a short support leg 85 that is produced by a correspondingly short cover strip 70'. Placed thereon is a bottom plate that is not shown in detail. Following this is a first section of a connection support 95 for the securing of wood panels 94. Therefore, in this section the other cover strip 70 of FIG. 3 is used, which has an appropriate length 75. In this section 95, clamping strips 20 are naturally provided which are held in their height position in the support leg section 95 by the cover strips 70 disposed therebelow, because with the cover strips 70' the projections 89 extend into the region of the enlarged slot portion 16 and therefore in turn support the clamping strip 20 disposed thereabove in the section 95. Via appropriate lengths 75 or 91 of the two cover strips 70, 70', there thereupon follow in the cabinet first three support leg sections 85', 85'', and 85''', between which are located the cover strips 70' respectively position plates 68', 68''. There finally again follows a section of a connection support 95' for securing wood strips 94'.

The embodiment of FIG. 13 shows a chest 96, the lower portion of which initially has a connection support 95'' for wall panels that cannot be seen. In the front region is disposed a door 97 having hinges 98 that are held firmly in place by the clamping action of the clamping strip disposed at that location in the slot of the associated profiled member 10. This is basically also what occurs with the glass door 97' of the glass cabinet 80 of FIG. 11. In this support section 95'' again appropriately long cover strips 70 of the type illustrated in FIG. 3 are used. There the follows a section 85' in the form of a support leg, so that here the cover strips 70' of FIG. 4 are used. Disposed therebetween is again a plate 68, with the chest 96 being closed off at the top by a top plate 76. The aforementioned table 84 of FIG. 14 also has a similar construction, although in this case only the cover strips 70′ of FIG. 4 are utilized in the two support leg sections 85, 85′.

FIGS. 8 to 10 show a further variant of a cover strip 70″, the edge portions of which have a construction similar to that of the cover strip 70, so that it permits securing of plate-like elements 11. However, this cover strip 70″ is provided with an undercut longitudinal groove 99 for receiving intermediate plate supports 100, which comprise a hammer-head-like securing part 101 having a threaded shaft 103 upon which can be screwed a threaded sleeve 104. By screwing the threaded sleeve 104, the groove wall 102 is clamped between the hammer head of the securing part 101 on the one hand, and the end face of the threaded sleeve 104 on the other hand. The intermediate plate support 100 is thus secured at a certain height, and can serve for the support of an intermediate plate 105.

A strip 106 having a U-shaped cross-section is introduced into the other slot 12′ in FIGS. 8 to 10, where it is held in place by the pressure screw 40. One leg 109 of this strip is essentially planar and rests against the stationary slot wall 15 of the profiled member 10. In contrast, the other U-leg 110 is bent in conformity with a partial contour of the pressure strip 20. Thus here also there results an abutment surface against which the pressure screw 40 can engage. The leg end 111 can be supported in the recess 67 in the slot base 18. In the present embodiment, the U-side or crown 107 of the strip 106 is provided with slots 108 into which can be introduced the hook ends of known support arms 113. As shown in FIG. 10, these support arms 113 can hold a shelf plate 112. With such strips 70″ and 106, the possible variations for the furniture of FIGS. 11 to 14 are increased even further.

The present invention is, of course, in no way restricted to the specific disclosure of the specification and drawings, but also encompasses any modifications within the scope of the appended claims.

I claim:

1. A profiled member for clamping plate-like elements, comprising:

at least one slot means that extends in the longitudinal direction of said profiled member, with each of said slot means being defined by a first and a second stationary planar wall, with said first and second walls being disposed at an angle relative to one another, and with said second wall being in the form of a guide surface, with each of said slot means being further defined by a third wall that proceeds from said second wall and, remote from the latter, has a free edge that defines an introduction opening, for a plate-like element, remote from a base portion of said slot means that interconnects said first and second walls, with said third wall and said second wall defining a triangular-shaped, enlarged portion of said slot means, with said third wall being provided with threaded through-holes for accommodating pressure-applying screws; and respective profiled clamping strips that can be accommodated in respective ones of said enlarged slot portions and can be displaced by said pressure-applying screws, with each of said clamping strips having a fundamentally wedge-like cross-sectional shape which, when said clamping strip is installed in an enlarged slot portion, includes a wedge point region that faces said base portion of said slot means, a first wedge surface that is adjacent to said wedge point region and is displaceably supported on said guide surface, and a second wedge surface that is also adjacent to said wedge point region, extends parallel to said first wall, and defines wherein said slot means a parallel-walled slot of changeable width for accommodating and holding in place an edge portion of a plate-like element, with each of said clamping strips also including an abutment surface that interconnects said first and second wedge surfaces and is acted upon by said pressure-applying screws, with the pressure-application direction of each of said pressure-applying screws extending parallel to said guide surface; each of said clamping strips is furthermore provided with integral parts that project from said wedge-like cross-sectional shape and are disposed in said slot means to secure the position of said clamping strip in said enlarged slot portion, with at least a portion of one of said integral parts extending parallel to said guide surface and being accommodated, for effective guidance, in a complementary aperture that is provided in said third wall and also extends parallel to said guide surface; each of said clamping strips being provided with zones of materials that differ from one another, including a core zone of relatively hard material, and at least one edge zone, the material of which is softer than that of said core zone; said integral parts for securing the position of said clamping strip in said slot means including a flexible flap that projects beyond said wedge-like cross-sectional shape and, in the installed state of said clamping strip, has at least one part that extends transverse to said parallel-walled slot.

2. A profiled member according to claim 1, in which said core and edge zones are made of plastic materials having different Shore hardnesses, with said zones being interconnected at a contact area to thereby form a one-piece clamping strip.

3. A profiled member according to claim 1, in which said zones of said clamping strip are co-extruded zones, including a coordinated, side-by-side extrusion of said zones, and a subsequent combination of said zones in a common tool that has the overall cross-sectional area of said clamping strip.

4. A profiled member according to claim 1, in which said flap forms said edge zone of softer material, and said wedge-like cross-sectional shape of said clamping strip forms said core zone of essentially hard material.

5. A profiled member according to claim 1, in which in the installed state of said clamping strip, said flap extends in the vicinity of said base portion of said slot means to thereby provide a particularly soft abutment surface for the narrow edge of a plate-like element introduced into said parallel-walled slot.

6. A profiled member according to claim 1, in which said slot means is provided with a recess into which a portion of said flap is pressed in the clamping state of said clamping strip.

7. A profiled member according to claim 6, in which said recess is disposed in the region of said base portion of said slot means.

8. A profiled member according to claim 1, in which said flap contacts said wedge-like cross-sectional shape of said clamping strip at a contact area, where said flap is provided with an undercut.

9. A profiled member according to claim 8, in which said flap, in the vicinity of its contact with said wedge-like cross-sectional shape, comprises a base part that extends in the contour region of said wedge-like cross-sectional shape, with an end piece that projects beyond said wedge-like cross-sectional shape being connected to said base part and extending transverse to said second wedge surface.

10. A profiled member according to claim 8, in which, in the clamping state of said clamping strip against a plate-like element, said flap can be deformed into a bend, especially in the region of its undercut.

11. A profiled member according to claim 9, in which said integral parts for securing the position of said clamping strip in said slot means further include at least one rigid, profiled projection that projects beyond said wedge-like cross-sectional shape of said clamping strip and extends into said aperture in said third wall.

12. A profiled member according to claim 11, in which said aperture in said third wall has planar sides, and in which said profiled projection essentially extends in said pressure-application direction of said pressure-applying screws and has planar sides that rest against said planar sides of said aperture.

13. A profiled member according to claim 11, in which said wedge-like cross-sectional shape of said clamping strip is essentially in the form of an isosceles right triangle, with the hypotenuse of the triangle forming said second wedge surface, which presses against an inserted plate-like element, with a first short side of the triangle facing said base portion of said slot means and forming said first wedge surface, which is displaceably guided along said guide surface of said profiled member, and with a second short side of the triangle facing said introduction opening of said slot means and forming said abutment surface for said pressure-applying screws.

14. A profiled member according to claim 13, in which, when looking at a cross-sectional view of said clamping strip, said base part of said flap extends in the direction of said first short side of the triangle, with said end piece of said flap being connected to said base part via a bend and extending essentially at a right angle to said hypotenuse.

15. A profiled member according to claim 14, in which said profiled projection projects from said second short side of said triangle, and extends parallel to said first short side.

16. A profiled member according to claim 15, in which said profiled projection comprises a profiled base portion that is seated on said second short side of said triangle, and further comprises a profiled end portion that is connected to said base portion, is narrower than the latter, and is provided with parallel side surfaces.

17. A profiled member according to claim 1, in which said third wall of said profiled member has an inwardly directed surface remote from said slot means; and which includes profiled cover strip means for covering said inwardly directed surface, with said cover strip means and said profiled member being provided with edge means for holding said cover strip means on said profiled member in the vicinity of said slot means.

18. A profiled member according to claim 1, which includes a strip that can be introduced into said slot means, and has a U-shaped cross-section, with one of the legs of said U-strip having the shape of a portion of the contour of said clamping strip, and being adapted to be clamped in said slot means via said pressure-applying screws.

* * * * *